(12) United States Patent
Jacobson et al.

(10) Patent No.: US 7,550,060 B2
(45) Date of Patent: Jun. 23, 2009

(54) METHOD AND ARRANGEMENT FOR FEEDING CHEMICALS INTO A PROCESS STREAM

(75) Inventors: Tommy Jacobson, Helsinki (FI); Mika Salonen, Espoo (FI); Martti Latva, Rusko (FI)

(73) Assignee: Nalco Company, Naperville, IL (US)

( * ) Notice: Subject to any disclaimer, the term of this patent is extended or adjusted under 35 U.S.C. 154(b) by 398 days.

(21) Appl. No.: 11/339,169

(22) Filed: Jan. 25, 2006

(65) Prior Publication Data

US 2007/0169908 A1 Jul. 26, 2007

(51) Int. Cl.
*D21F 11/00* (2006.01)

(52) U.S. Cl. .................. 162/158; 162/202; 162/209; 162/336; 162/380; 427/361

(58) Field of Classification Search .......... 162/135, 162/141, 205, 209, 183, 202, 185, 380, 336, 162/289; 427/361; 222/1, 630
See application file for complete search history.

(56) References Cited

U.S. PATENT DOCUMENTS

| 3,428,520 | A | * | 2/1969 | Yiannos ................ 162/38 |
|---|---|---|---|---|
| 5,466,063 | A | | 11/1995 | Poyet |
| 6,659,636 | B1 | | 12/2003 | Matula |
| 2004/0040679 | A1 | | 3/2004 | Kilgannon et al. |
| 2004/0055869 | A1 | | 3/2004 | Moore |
| 2004/0222239 | A1 | | 11/2004 | Hayduk |
| 2007/0258315 | A1 | | 11/2007 | Matula |

FOREIGN PATENT DOCUMENTS

| FI | 110015 | 11/2002 |
|---|---|---|
| WO | 2006/008333 | 1/2006 |

* cited by examiner

*Primary Examiner*—Mark Halpern
(74) *Attorney, Agent, or Firm*—Peter A. DiMattia; Michael B. Martin

(57) ABSTRACT

An apparatus for feeding one or more chemicals into a process stream of a papermaking process is disclosed, as well as a method of utilizing the apparatus for feeding one or more chemicals into a process stream is disclosed.

27 Claims, 6 Drawing Sheets

METHOD AND ARRANGEMENT FOR FEEDING CHEMICALS INTO A PROCESS STREAM

FIELD OF THE INVENTION

This disclosure relates to a method and apparatus for feeding chemicals into a process stream of a papermaking process.

BACKGROUND

Various types and amounts of chemicals are added to a papermaking process. In particular, chemicals are added into a process stream of a papermaking process. The optimal feeding of these chemicals is both a quality and a cost issue in that the optimal feeding of chemicals into a process stream results in the following: a) better runnability of the paper machine; b) the quantity of the end product is more predictable and uniform; c) less web breaks and down-time of the paper machine; d) a reduction in the quantity of the chemical that needs to feed into a papermaking machine; e) smaller consumption of fresh water; and f) less energy is needed to heat fresh water.

Optimal feeding of chemicals into a process stream occurs when there is rapid mixing of chemical into the process stream, presence of locally stoichiometric conditions, minimized water usage in the feeding arrangement, and optimal residence/contact times of chemicals. More specifically, having locally stoichiometric conditions means having the optimal ratio of chemicals in the process stream for the chemicals to react, and optimal residence time of the chemicals means that the chemicals should be fed into the process stream so that all the chemicals that have been fed into the system have had enough time to take effect but not too long to maintain the desired effect.

Many prior art methods and apparatuses for feeding chemicals into a process stream of a papermaking process do not result in the optimal feeding of chemicals into the process stream of a papermaking process. Therefore, a need for an apparatus and method that can optimally feed one or more chemicals into a process stream exists in the papermaking industry.

SUMMARY OF THE INVENTION

The present invention provides an apparatus for feeding one or more chemicals into a process stream of a papermaking process comprising: a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and optionally an adaptor that is in communication with said outlets of said mixing chamber and is secured to said mixing chamber.

The present invention also provides for a method for feeding one or more chemicals into a process stream of papermaking process comprising: providing one or more mixing apparatuses comprising a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; mounting an adaptor over an opening in a thin stock line of said papermaking process, wherein said adaptor is in communication with said outlets of said mixing chamber and is secured to said mixing chamber; running said papermaking process so that said process stream flows through said thin stock line; introducing said chemicals and a feeding liquid into said mixing chamber by introducing said chemicals or feeding liquid into said inlets of said first conduit and said second conduit; mixing said chemicals and said feeding liquid in said mixing chamber to form a mixture of said chemicals and said feeding liquid; and dispensing said mixture into said process stream of said thin stock line through said adaptor.

DETAILED DESCRIPTION OF THE INVENTION

Figure 2:
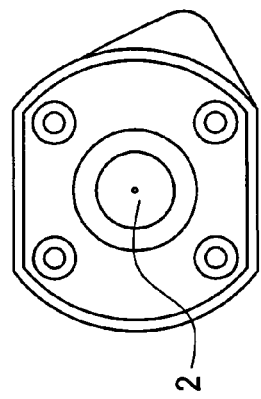
FIG. 2 is a cross-sectional view of the apparatus of FIG. 1.
Figure 4:
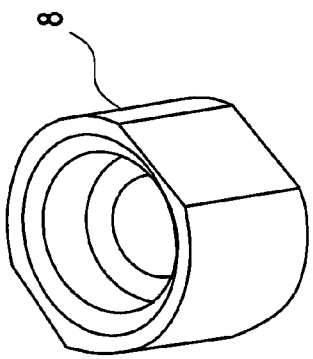
FIG. 4 is a side elevation view of the adaptor of the apparatus of FIG. 1.
Figure 1:
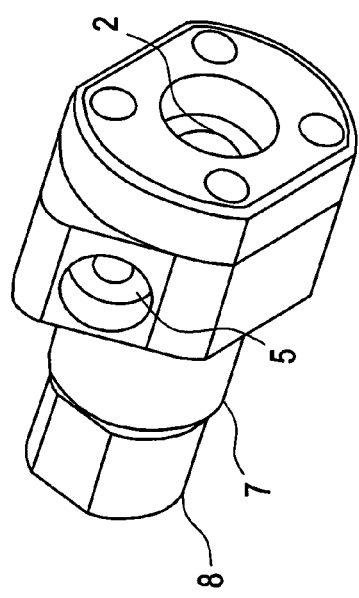
FIG. 1 is a side elevation view of an apparatus according to one embodiment of the present invention.
Figure 3:
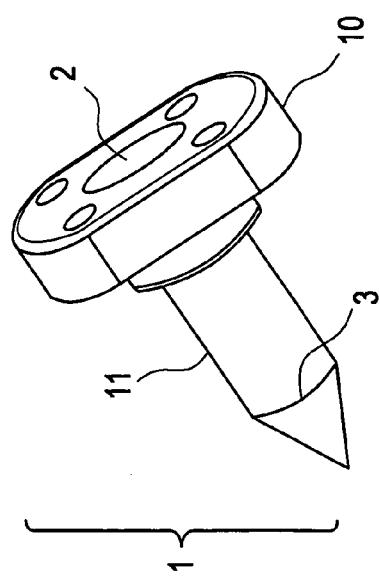
FIG. 3 is a side elevation view of the first conduit of the apparatus of FIG. 1.
Figure 5:
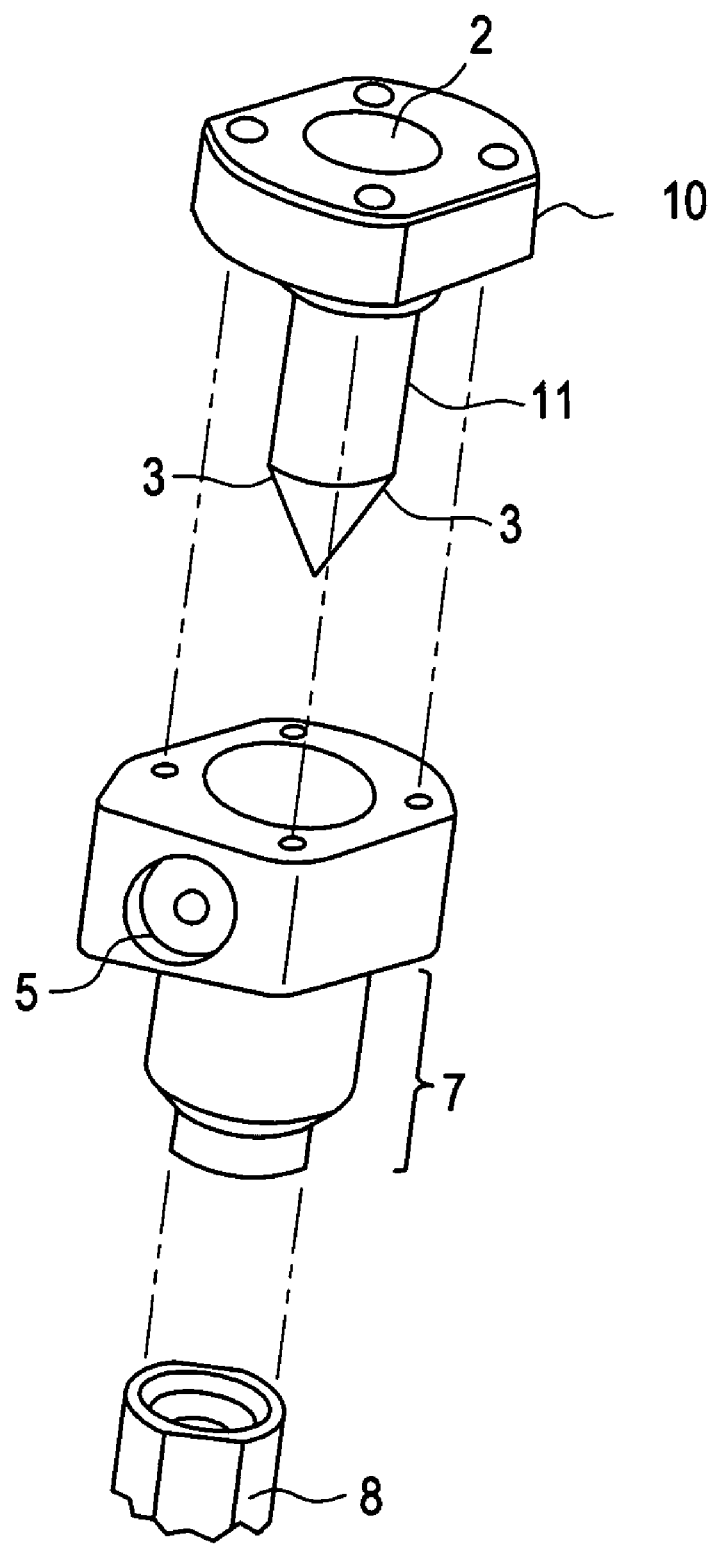
FIG. 5 is an exploded side elevation view of the first conduit, second conduit, mixing chamber and adaptor of one embodiment of the present invention.

"Papermaking process" means a method of making paper products from pulp comprising forming an aqueous cellulosic papermaking furnish, draining the furnish to form a sheet and drying the sheet. The steps of forming the papermaking furnish, draining, and drying may be carried out in any conventional manner generally known to those skilled in the art.

"Thin stock line" means a pipeline between a machine chest and headbox of a paper machine.

The apparatus of the present invention is essentially a reactor where chemical reactions can either: a) happen to activate the chemicals added to the apparatus expeditiously under controlled conditions, or b) the chemicals can be prevented from mixing with each other or other species by selecting appropriate mixing times versus chemical kinetics and shear levels. For example, the reaction rate of the chemicals that are being added to the process stream can be slowed down or even prevented by ensuring much slower chemical kinetics than the residence times inside the device.

As stated above, the apparatus of the present invention includes four primary components: a first conduit (1); a second conduit (4); a mixing chamber (7); and optionally an adaptor (8). The dimensions and geometries of each element of the apparatus depends upon how much chemical needs to be added to the papermaking process, as well other factors, such as the construction of the thin stock line (9). The apparatus of the present invention may be made of any suitable material for handling various types of papermaking chemicals, for example, stainless steel.

The first conduit (1) has one or more inlets (2) and outlets (3). Preferably, the conduit has both a head portion (10) and a portion (11) that is conical in shape.

The second conduit (4) has one or more inlets (5) and outlets (6). The second conduit (4) secures to the first conduit's head portion (10) by any fastening means that would be appreciated by one of ordinary skill in the art, for example, the head portion (10) of the first conduit and the second conduit (4) may have one or more openings so that a screw can secure one conduit to another.

The mixing chamber (7) has one or more inlets (17) and outlets (18) that are in communication with the outlets of both the first conduit (1) and the second conduit (4). The mixing chamber (7) secures to the second conduit (4). The mixing chamber (7) may secure to the second conduit (4) by any fastening means that would be appreciated by one of ordinary skill in the art, for example, both the second conduit (4) and the mixing chamber (7) may have one or more openings so that a screw can secure the second conduit to the mixing chamber, or the outer surface of the mixing chamber (7) can fuse to the outer surface of the second conduit (4).

The adaptor (8) secures to the mixing chamber (7) and is communication with the outlets of the mixing chamber (7). The adaptor (8) may secure to the mixing chamber (7) by any fastening means that would be appreciated by one of ordinary skill in the art, for example, a portion of the mixing chamber (7) may insert into the adaptor (8).

In another embodiment, the inlets (5) of said second conduit (4) are perpendicular to said outlets of said second conduit (4).

In another embodiment, the first conduit (1) traverses said second conduit (4) perpendicular to the inlets (5) of said second conduit (4).

In another embodiment, the first conduit (1) has a head portion (10) that does not traverse said second conduit (4) and a portion that traverses said second conduit (4), wherein the portion (11) that traverses said second conduit (4) is conical in shape and wherein the point of said first conduit (1) is in communication with said mixing chamber (7).

As stated above, the present invention provides for a method of feeding one or more chemicals into a process stream. In one embodiment, the (12) adaptor (8), alone or as part of the apparatuses for feeding, is mounted over an opening (16) in the thin stock line (9) and the adaptor (8) is secured to the thin stock line (9) by any means that would be appreciated by one of ordinary skill in the art. The feeding apparatus of the present invention, if not already done so, is connected with the adaptor. Various methods for introducing the chemicals and feeding liquid into the apparatus may be employed, for example, through a pipeline or tubing that are in communication with the apparatus. After this setup is established, one or more chemicals and a feeding liquid are introduced into the apparatus (12), mixed in the mixing chamber (7), and fed into the thin stock line (9).

In another embodiment, the co-feeding of different chemicals into a process stream (13) can be achieved by the following steps: introducing several different chemicals into the apparatus (12), allowing a mixture of the different chemicals to form, and dispensing the mixture into a process stream (13); or by aligning a series of apparatuses (12) and dispensing chemicals. Chemicals may be added to the system in any order prescribed by a person of ordinary skill in the art. For example, chemicals maybe added sequentially, simultaneously or in pre-programmed order.

Figure 8:
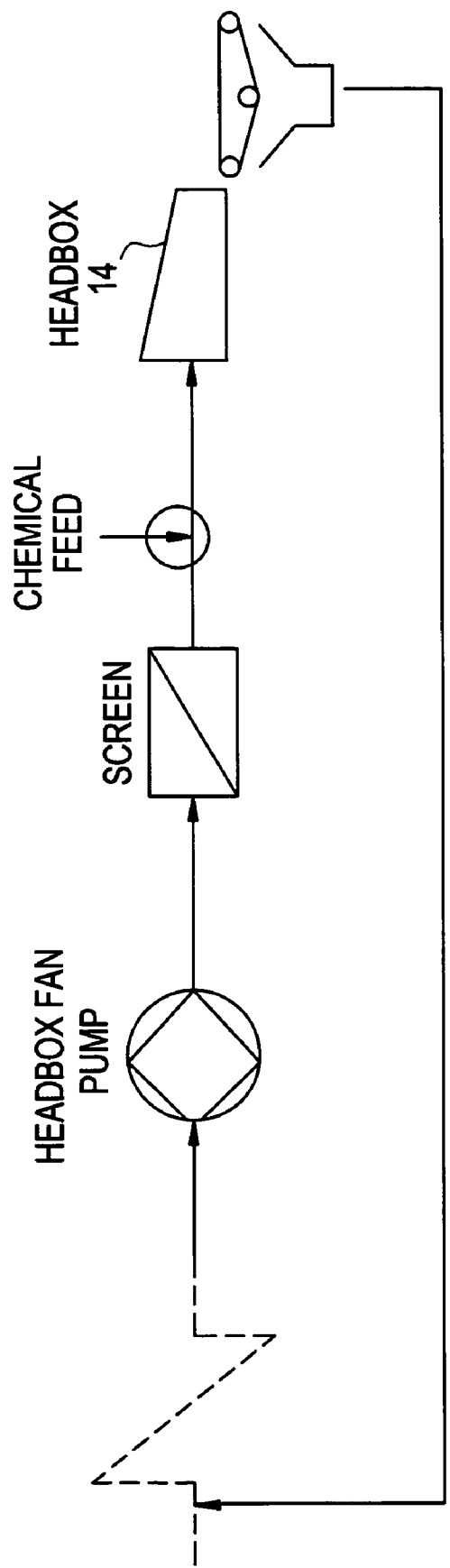
FIG. 8 illustrates a schematic drawing of a headbox approach system/thin stock line.
Figure 9:
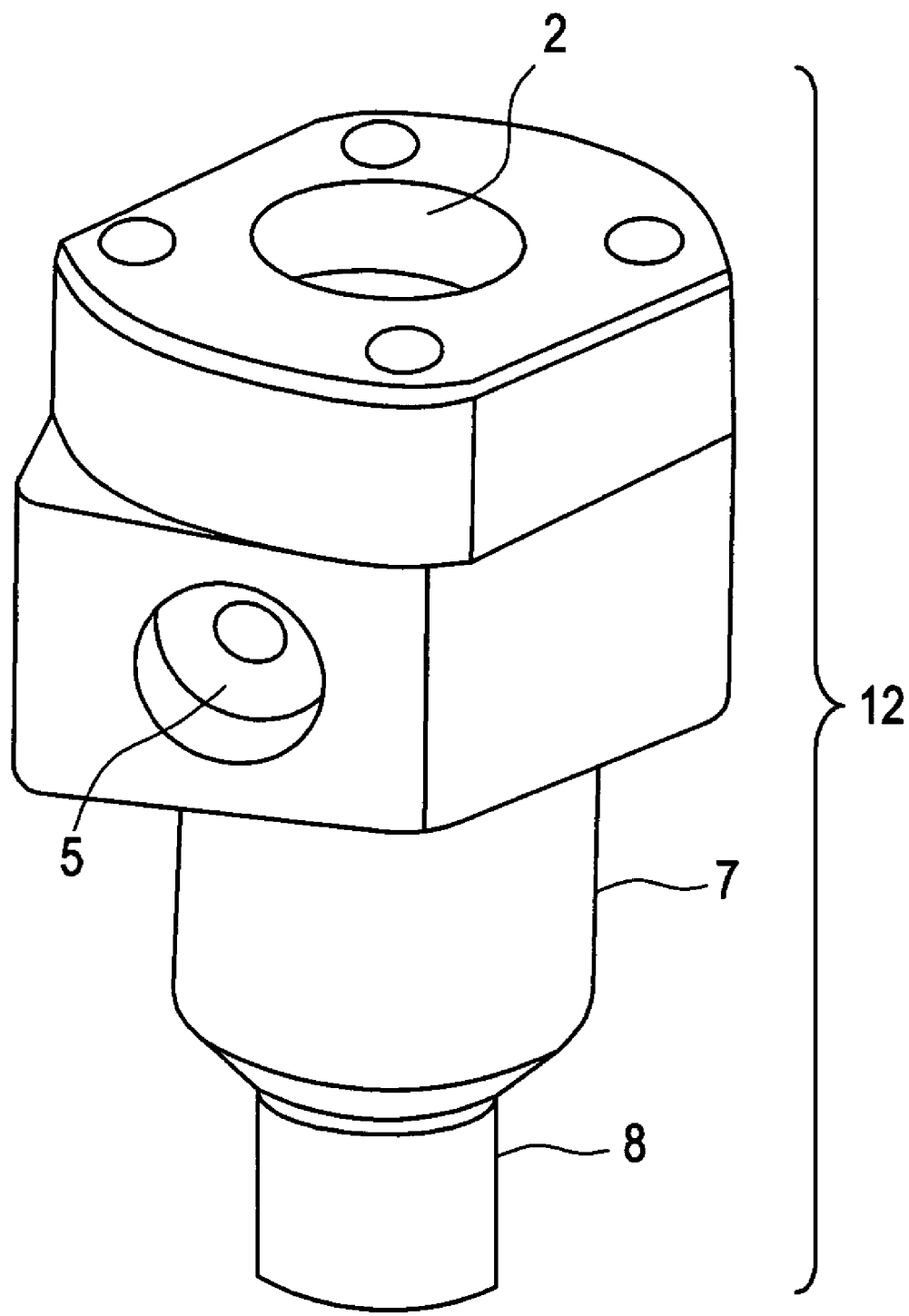
FIG. 9 is a side elevation view of an apparatus according to one embodiment of the present invention.

In another embodiment, as illustrated in FIG. 8, one or more apparatuses (12) for feeding chemicals into a process stream are positioned proximate to a headbox (14) of said papermaking process. This orientation reduces the possibility of deactivation of the chemicals added to the process stream and unnecessary time delays, which hence reduces the amount of chemicals needed, and provides better control of both the chemicals added to the process stream and final end product properties.

In another embodiment, the mixing is a staged mixing-mixing of chemicals prior to their introduction into the process stream. Staged mixing lasts for a time period that comports with the desired reaction rate of the chemicals feed into the mixing apparatus. In yet a further embodiment, the staged mixing lasts from about 5 microseconds to about 500 milliseconds.

In another embodiment, the activity of said chemicals is controlled by adjusting the flow rate of said chemicals and said feeding liquid, which are introduced into said apparatuses. One or more pumps that are in communication with said apparatuses may adjust the flow rate of the chemicals and feeding liquid that are being introduced into the apparatus of the present invention. Staged mixing can be achieved in the mixing chamber by controlling flow rates of both the chemicals and the feeding liquid into the mixing chamber.

In another embodiment, the activity of said chemicals, prior to their introduction into said process stream, is controlled by adjusting the flow rate of said chemicals and said feeding liquid, which are introduced into said mixing chamber.

In another embodiment, the chemicals are selected from the group consisting of: biocides, strength agents, brightening agents, colors, fillers, sizing agents, retention aids, drainage aids, flocculants, washing aids, defoamers, dispersing agents, nanoparticles, microparticles, fixatives, coagulants, and a combination thereof. Various chemical treatment programs employing one or more chemicals may be developed by one of ordinary skill in the art and employed by the apparatuses (12) of the claimed invention.

In another embodiment, the feeding liquid is selected from the group consisting of: fresh water; clear filtrate; whitewater; thin stock; and a combination thereof.

In another embodiment, the chemicals are diluted with a dilution liquid prior to their introduction in said first conduit (1) or said second conduit (4). In yet a further embodiment, the dilution liquid contains water.

In another embodiment, the process stream (13) contains a furnish of a papermaking process.

In another embodiment, the process stream (13) contains a thin stock of a papermaking process.

Figure 6:
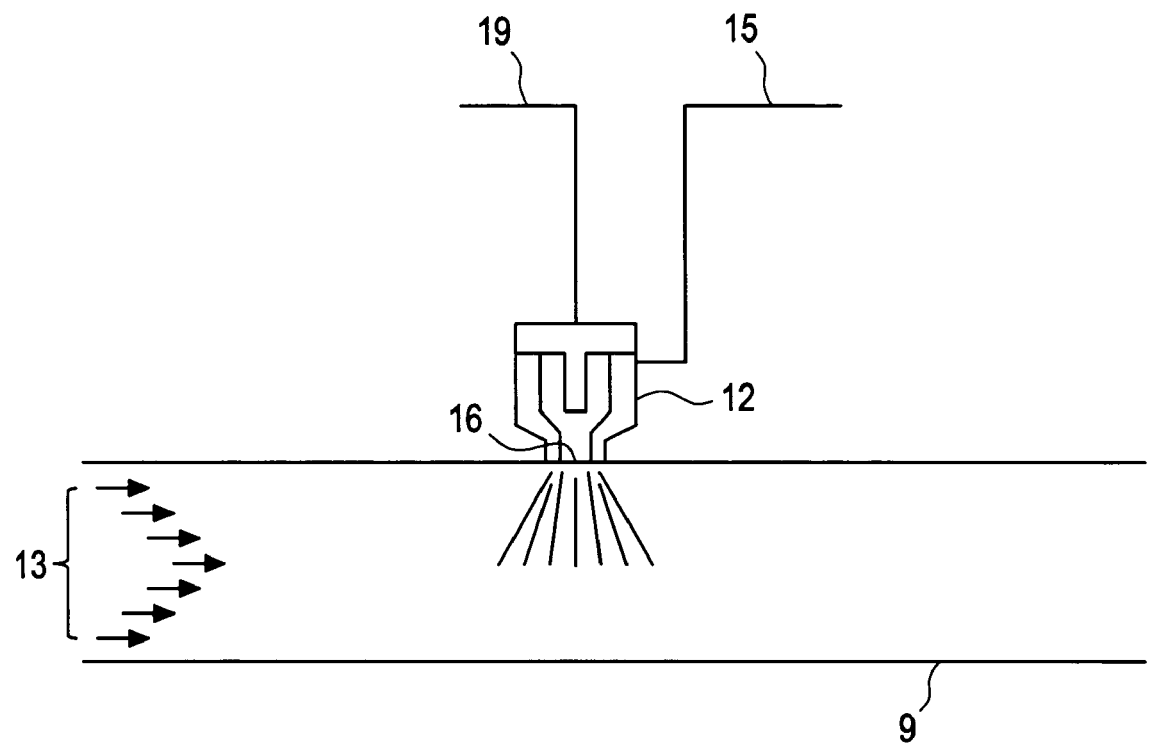
FIG. 6 represents a schematic illustration of a method of feeding chemical into a process stream in accord with one embodiment of the present invention.
Figure 7:
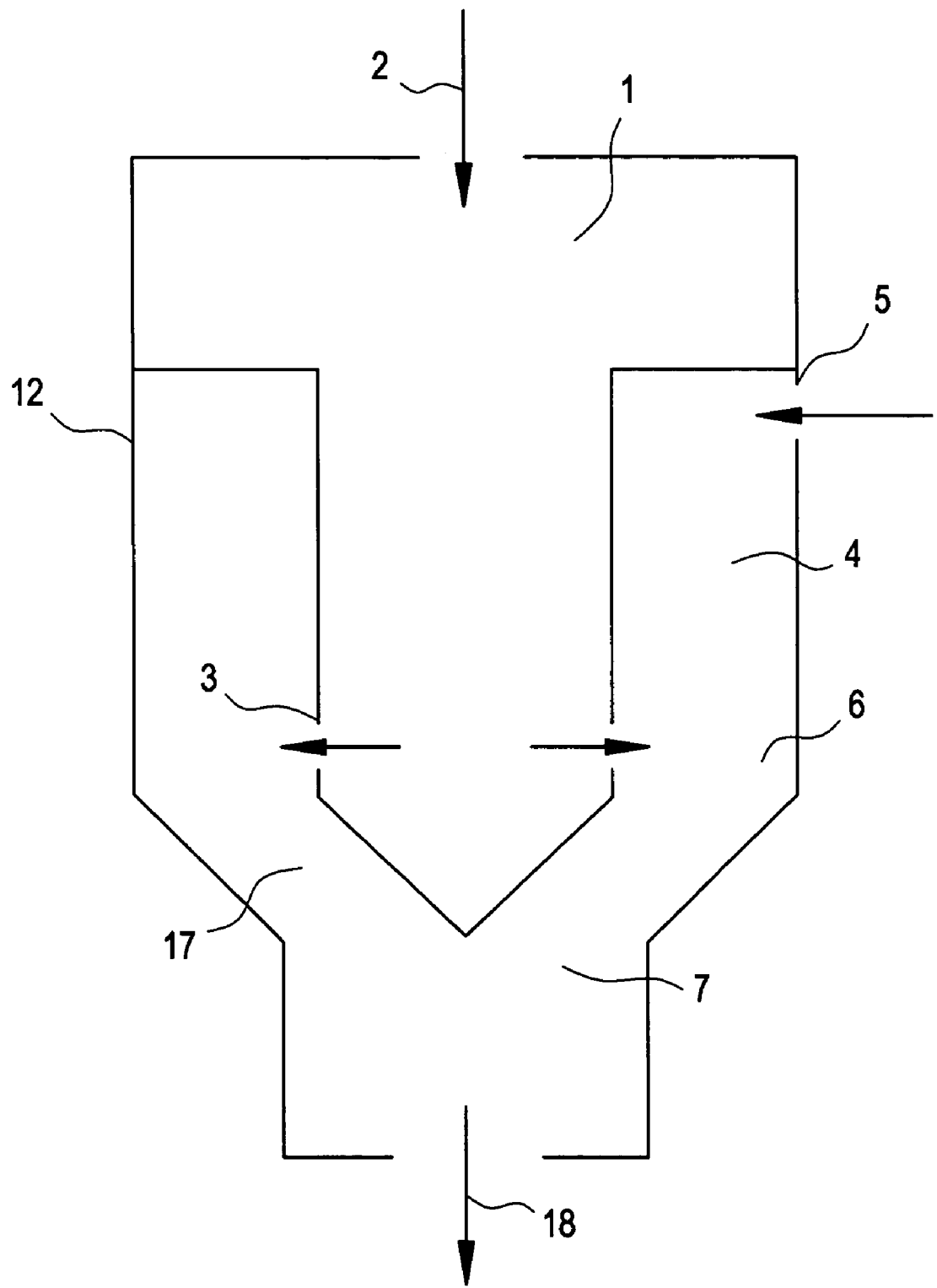
FIG. 7 represents a schematic illustration of an apparatus of the present invention.

Referring to both FIGS. 6 and 7, in one embodiment, chemicals (19) are introduced into the inlet (2) of a first conduit (1). Subsequently the chemicals flow through the conduit and out said outlets (3) of the first conduit (1) and into the inlets (17) of the mixing chamber (7). A feeding liquid (15) is also introduced into a second conduit (4). The liquid in the second conduit (4) swirls or vortexes around the first conduit (1) and exits out the outlets (6) of the second conduit and into the mixing chamber (7) via the inlets (17) of the mixing chamber (7). The two fluids from the first conduit (1) and the second conduit (4) mix in the mixing chamber (7) and then the mixture flows through the mixing chamber (7) outlet (18), which in turn flows through the adaptor(S) that is mounted to an opening (16) in the process stream (13) and this liquid subsequently flows into the process stream (13).

We claim:

1. A method for feeding one or more chemicals into a process stream of a papermaking process comprising:
   a. providing one or more mixing apparatuses comprising a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber;
   b. mounting said apparatuses containing an adaptor over an opening in a thin stock line of said papermaking process;
   c. running said papermaking process so that said process stream flows through said thin stock line of said papermaking process;
   d. introducing one or more chemicals and a feeding liquid into said mixing chamber of said apparatuses by introducing said chemicals or said feeding liquid into said inlets of said first conduit and said second conduit of said apparatuses;
   e. mixing said chemicals and said feeding liquid in said mixing chamber of said apparatuses to form a mixture of said chemicals and said feeding liquid; and
   f. dispensing said mixture into said process stream of said thin stock line through said adaptor of said apparatuses that is in communication with said process stream.

2. The method of claim 1, wherein said chemicals are diluted with a dilution liquid prior to their introduction into said first conduit or said second conduit.

3. The method of claim 1, wherein said chemicals and said feeding liquid are introduced sequentially, simultaneously or in a pre-programmed order.

4. The method of claim 1, wherein said dilution liquid is preferably fresh water.

5. The method of claim 1, wherein said feeding liquid is selected from the group consisting of: fresh water; clear filtrate; whitewater; and thin stock; or a combination thereof.

6. The method of claim 1, wherein said process stream contains a thin stock of a papermaking process.

7. The method of claim 1, wherein said chemicals are selected from the group consisting of: biocides, strength agents, brightening agents, colors, fillers, sizing agents, retention aids, drainage aids, flocculants, washing aids, defoamers, dispersing agents, nanoparticles, microparticles, fixatives, coagulants, and a combination thereof.

8. The method of claim 1, wherein said mixing is a staged mixing.

9. The method of claim 8, wherein said staged mixing lasts from about 5 microseconds to, about 500 milliseconds.

10. The method of claim 1, wherein said process steam contains a furnish of said papermaking process.

11. The method of claim 1, wherein said mixing apparatuses are positioned proximate to a headbox of said papermaking process.

12. The method of claim 1, wherein said apparatuses are aligned in series prior to a headbox of said papermaking process.

13. The method of claim 1, further comprising providing one or more pumps that are in communication with said apparatuses inlets and wherein said pumps control the flow rate of said chemicals and said feeding liquid.

14. A method for feeding one or more chemicals into a process stream of a process:
   a. providing one or more mixing apparatuses comprising a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber;
   b. mounting said apparatuses containing an adaptor over an opening in said process stream;
   c. running said process stream of said process;
   d. introducing one or more chemicals and a feeding liquid into said mixing chamber of said apparatuses by introducing said chemicals or said feeding liquid into said inlets of said first conduit and said second conduit of said apparatuses;
   e. mixing said chemicals and said feeding liquid in said mixing chamber of said apparatuses to form a mixture of said chemicals and said feeding liquid; and
   f. dispensing said mixture into said process stream of said process through said adaptor of said apparatuses that is in communication with said process stream.

15. The method of claim 14, wherein said chemicals are diluted with a dilution liquid prior to their introduction into said first conduit or said second conduit.

16. The method of claim 15, wherein said dilution liquid is preferably fresh water.

17. The method of claim 14, wherein said feeding liquid is selected from the group consisting of: fresh water; clear filtrate; whitewater; or a combination thereof.

18. The method of claim 14, wherein said chemicals are selected from the group consisting of: biocides, strength agents, brightening agents, colors, fillers, sizing agents, retention aids, drainage aids, flocculants, washing aids, defoamers, dispersing agents, nanoparticles, microparticles, fixatives, coagulants, and a combination thereof.

19. The method of claim 14, wherein said mixing is a staged mixing.

20. The method of claim 14, wherein said feeding liquid and said chemicals enter into a different conduit.

21. A method for feeding one or more chemicals into a process stream of a process:
   a. providing one or more mixing apparatuses comprising a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber;
   b. mounting said apparatuses containing an adaptor over an opening in said process stream;
   c. running said process stream of said process;
   d. introducing one or more chemicals into said mixing apparatuses by introducing said chemicals into said apparatuses to form a mixture containing said chemicals; and
   e. dispensing said mixture into said process stream.

22. The method of claim 21, wherein said chemicals are selected from the group consisting of: biocides, strength agents, brightening agents, colors, fillers, sizing agents, retention aids, drainage aids, flocculants, washing aids, defoamers, dispersing agents, nanoparticles, microparticles, fixatives, coagulants, and a combination thereof.

23. The method of claim 21, wherein said one or more chemicals are two different chemicals.

24. The method of claim 21, wherein said process is a papermaking process.

25. The method of claim 21, further comprising adding a feeding liquid into said mixing apparatuses in addition to said chemicals that are added to said mixing apparatuses.

26. The method of claim 21, wherein said feeding liquid is selected from the group consisting of: fresh water; clear filtrate; whitewater, and thin stock; or a combination thereof.

27. A method for feeding one or more chemicals into a process stream of a papermaking process comprising:
  a. providing one or more mixing apparatuses comprising a first conduit having one or more inlets and outlets; a second conduit having one or more inlets and outlets, wherein said first conduit secures to said second conduit and traverses said second conduit; a mixing chamber that has one or more inlets and outlets, wherein said second conduit secures to said mixing chamber and wherein said outlets of said first conduit and said outlets of said second conduit are in communication with said mixing chamber; and an adaptor that is in communication with said outlet of said mixing chamber and is secured to said mixing chamber;
  b. mounting said apparatuses containing an adaptor over an opening in said papermaking process;
  c. running said papermaking process so that said process stream flows through said papermaking process;
  d. introducing one or more chemicals and a feeding liquid into said mixing chamber of said apparatuses by introducing said chemicals or said feeding liquid into said inlets of said first conduit and said second conduit of said apparatuses;
  e. mixing said chemicals and said feeding liquid in said mixing chamber of said apparatuses to form a mixture of said chemicals and said feeding liquid; and
  f. dispensing said mixture into said process stream of said papermaking process through said adaptor of said apparatuses that is in communication with said process stream.

* * * * *